United States Patent
Wang et al.

(10) Patent No.: US 9,952,642 B2
(45) Date of Patent: Apr. 24, 2018

(54) CONTENT DEPENDENT DISPLAY VARIABLE REFRESH RATE

(71) Applicant: APPLE INC., Cupertino, CA (US)

(72) Inventors: Chaohao Wang, Cupertino, CA (US); Louis Luh, Sunnyvale, CA (US); Jun Qi, Cupertino, CA (US); Cheng Chen, Cupertino, CA (US); Jun Jiang, Cupertino, CA (US); Paolo Sacchetto, Cupertino, CA (US); Marc Albrecht, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 16 days.

(21) Appl. No.: 14/500,646

(22) Filed: Sep. 29, 2014

(65) Prior Publication Data

US 2016/0093239 A1 Mar. 31, 2016

(51) Int. Cl.
*G09G 3/20* (2006.01)
*G06F 1/32* (2006.01)
*G09G 5/00* (2006.01)

(52) U.S. Cl.
CPC .......... *G06F 1/32* (2013.01); *G09G 5/003* (2013.01); *G09G 2320/0247* (2013.01); *G09G 2330/021* (2013.01); *G09G 2340/0435* (2013.01); *G09G 2360/16* (2013.01)

(58) Field of Classification Search
CPC ................. G09G 3/2003; G09G 2330/021
See application file for complete search history.

(56) References Cited

U.S. PATENT DOCUMENTS

| | | |
|---|---|---|
| 7,362,294 B2 | 4/2008 | Liang et al. |
| 8,446,356 B2 | 5/2013 | Ooishi et al. |
| 8,477,158 B2 | 7/2013 | Umezaki et al. |
| 8,619,104 B2 | 12/2013 | Umezaki et al. |
| 8,624,913 B2 | 1/2014 | Manabe |

(Continued)

FOREIGN PATENT DOCUMENTS

| | | |
|---|---|---|
| CN | 101714335 A | 5/2010 |
| CN | 101740005 A | 6/2010 |

(Continued)

OTHER PUBLICATIONS

International Search Report and Written Opinion for PCT Application No. PCT/US2015/047759 dated Nov. 17, 2015; 11 pgs.

(Continued)

*Primary Examiner* — Carolyn R Edwards
(74) *Attorney, Agent, or Firm* — Fletcher Yoder PC

(57) ABSTRACT

Systems and methods for operating a display by dynamically determining a refresh rate for the display. In certain implementations, a processor determines a number of pixels having medium grayscale levels from a histogram for the image. If the number does not exceed a threshold, the processor sets a refresh rate for the display to a first refresh rate. In certain implementations, if the number exceeds a threshold, the processor may set the refresh rate for the display to a second refresh rate. Moreover, the first refresh rate may be lower than the second threshold. In some implementations, the image may be analyzed by subdividing the image into blocks and determining a refresh rate based on grayscale levels or distributions in the blocks. Based on the analysis of the blocks, a corresponding refresh rate may be selected.

24 Claims, 15 Drawing Sheets

(56) References Cited

U.S. PATENT DOCUMENTS

| | | |
|---|---|---|
| 8,730,276 B2 | 5/2014 | Kawabe |
| 8,976,207 B2 | 3/2015 | Umezaki et al. |
| 9,019,327 B2 | 4/2015 | Kawabe |
| 2010/0091033 A1 | 4/2010 | Itoyama et al. |
| 2012/0236021 A1 | 9/2012 | Parmar et al. |
| 2013/0100173 A1 | 4/2013 | Gholamreza et al. |
| 2013/0207951 A1* | 8/2013 | Didyk .................. G06T 3/40 345/207 |
| 2015/0228216 A1* | 8/2015 | Lee ..................... G09G 3/2029 345/691 |
| 2015/0287352 A1* | 10/2015 | Watanabe ............ G09G 3/20 345/89 |

FOREIGN PATENT DOCUMENTS

| | | |
|---|---|---|
| EP | 2924682 A1 | 9/2015 |
| TW | 201101277 A | 1/2011 |
| TW | 201137847 A | 11/2011 |
| WO | 20110099376 A1 | 8/2011 |
| WO | 20140080731 A1 | 5/2014 |

OTHER PUBLICATIONS

Taiwanese Office Action for Taiwanese Application No. 104128715 dated Apr. 28, 2016; 10 pgs.

* cited by examiner

I. In Tempus

*Optimis hercule temporibus fuit,*
*pessima est temporibus*
*sapientia aetate fuit,*
*Stultitia est aetas,*
*aetatibus fuisse credenda*
*aetatibus fuisse crederent,*
*tempus erat lux,*
*tempus est nox,*
*Erat fontem spei,*
*hiems erat desperandum,* ante omnia ut nos, nihil ad nos, nos recta ire ad caelum ire nos via recta, reliqua demum, quae nunc tantum per spatium temporis postulabat auctoritates aliquas eiusdem noisiest ut reciperetur in bono vel in malo, tantum in superlativo gradu comparationis.

Rex et regina cum magna bucca Erant planitiem in faciem super thronum Angliae regina esset rex cum magna bucca facie pulchra et in throno eius. In utroque autem crystallus clariora panum et piscium vivaria publicae ducibus, qui habitaverunt in communi semper.

Fabula de duae urbes folio I

CONTENT DEPENDENT DISPLAY VARIABLE REFRESH RATE

BACKGROUND

The present disclosure relates generally to a refresh rate for an electronic display.

This section is intended to introduce the reader to various aspects of art that may be related to various aspects of the present disclosure, which are described and/or claimed below. The background information discussed herein should provide the reader with a better understanding of various aspects of the present disclosure. Accordingly, it should be understood that these statements are to be read in this light, and not as admissions of prior art.

Electronic displays have multiple factors affecting display quality. For example, a refresh rate for a display may affect the quality of display. The refresh rate includes redrawing or refreshing a display regardless of whether an image being written appears different than the previously drawn image. Each refresh of the display consumes power. Therefore, a higher refresh rate may have higher display quality than a relatively low refresh rate. However, the relatively low refresh rate may cause introduce display artifacts, such as flicker.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to techniques for varying a refresh rate for a display based on grayscale levels of the display. Reducing a refresh rate of a display decreases power consumption of the display due to writing data to the LCDs less frequently. However, when the refresh rate is reduced below a certain level, the electronic display noticeably flickers in certain situations. The level may be different based on the content being currently displayed. Specifically, a refresh rate may cause a higher noticeability of flicker when more than a certain amount of pixels have medium grayscale levels (e.g., 100-155). Thus, when an image or frame has more pixels with a medium grayscale level than a desired level, the refresh rate may be selected at a higher rate (e.g., 30 Hz) than for an image or a frame that has less pixels with the medium grayscale level (e.g., 1 Hz or lower).

Furthermore, if the pixels having the medium grayscale levels are distributed throughout an image, the electronic display may be less prone to flicker at lower refresh rates. A display may use different refresh rates for images with a common histogram but different distributions of medium grayscale level pixels. In other words, spatially distributed medium grayscale level pixels may be display using lower refresh rates (e.g., 1 Hz or lower) than concentrated medium grayscale level pixels. Because lower refresh rates may be used for spatially distributed medium grayscale level pixels without substantially increasing flicker probability.

In some embodiments, a histogram may be used to analyze whether a relatively low frequency refresh rate (e.g., 1 Hz) or a relatively high frequency refresh rate (e.g. 30 Hz) based on grayscale levels. In some embodiments, the histogram may be used to determine whether further analysis should be performed on the image. For example, if the histogram indicates that the low frequency refresh rate may not be used without substantially increasing the susceptibility of the image to noticeable flicker, further analysis may be performed to determine an alternate low frequency rate (e.g., 10 Hz) lower than the relatively high frequency rate by successively running finer scans to establish a refresh rate. Refresh rates may be refined by successively scanning frames in smaller increments to save power without increasing a susceptibility to noticeable flicker.

Further, analysis of an image may be performed by subdividing the image into multiple blocks. In some embodiments, the blocks may be overlapping rectangles. The blocks may be used to track spatial distribution of grayscale levels in an image. Moreover, the size of the blocks may reduced in each successive scan to determine smaller increments of refresh rates that may be used to display an image while saving power without substantially increasing susceptibility of image to noticeable flicker.

BRIEF DESCRIPTION OF THE DRAWINGS

Various aspects of this disclosure may be better understood upon reading the following detailed description and upon reference to the drawings in which:

FIG. 11 illustrates an page of an electronic book that may be displayed on the display of the electronic device of FIG. 1, in accordance with an embodiment;

DETAILED DESCRIPTION OF SPECIFIC EMBODIMENTS

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, a refresh rate refers to the number of times that a display updates its hardware buffers or writes an image or frame of video to the screen regardless of whether the image or frame of video has changed. In other words, the refresh rate includes both new frames and repeated drawing of identical frames, while a framerate measures how often a video source can feed an entire frame of new data to a display. For example, some displays may have a framerate of 24 Hz such that the display advances from one frame to the next frame 24 times each second. Although the displays may have a framerate of 24 Hz, the same displays may cause each frame to be illuminated two or three times before the next frame is projected using a shutter in front of its lamp. Accordingly, some displays may have a framerate of 24 Hz, but the same displays may have a refresh rate of 48 Hz or 72 Hz. In other words, a refresh rate may be equal or greater to a framerate for the video or images being displayed.

Figure 1:
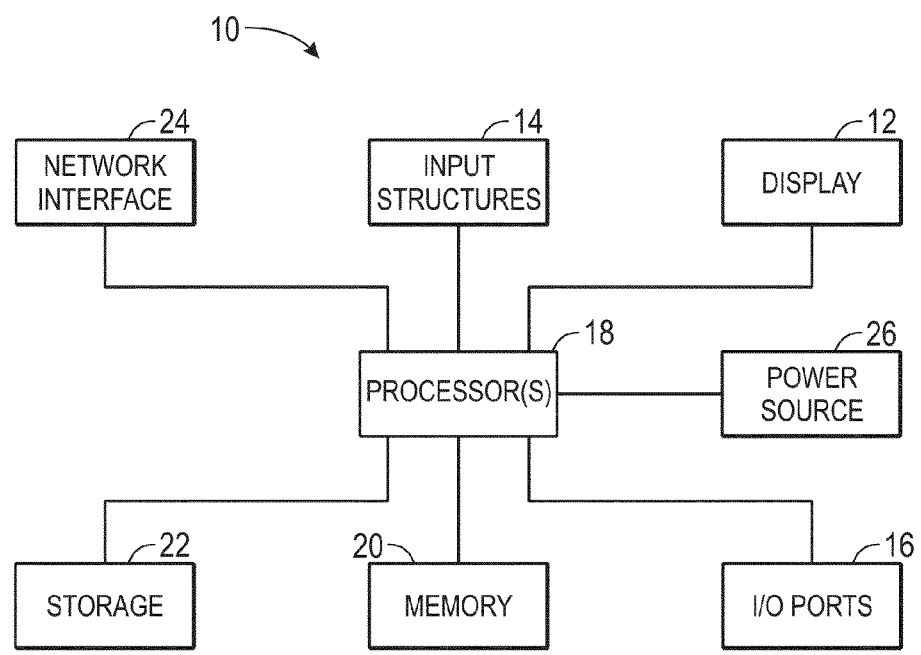
FIG. 1 is a block diagram of an electronic device that may use the techniques disclosed herein, in accordance with an embodiment.
Figure 2:
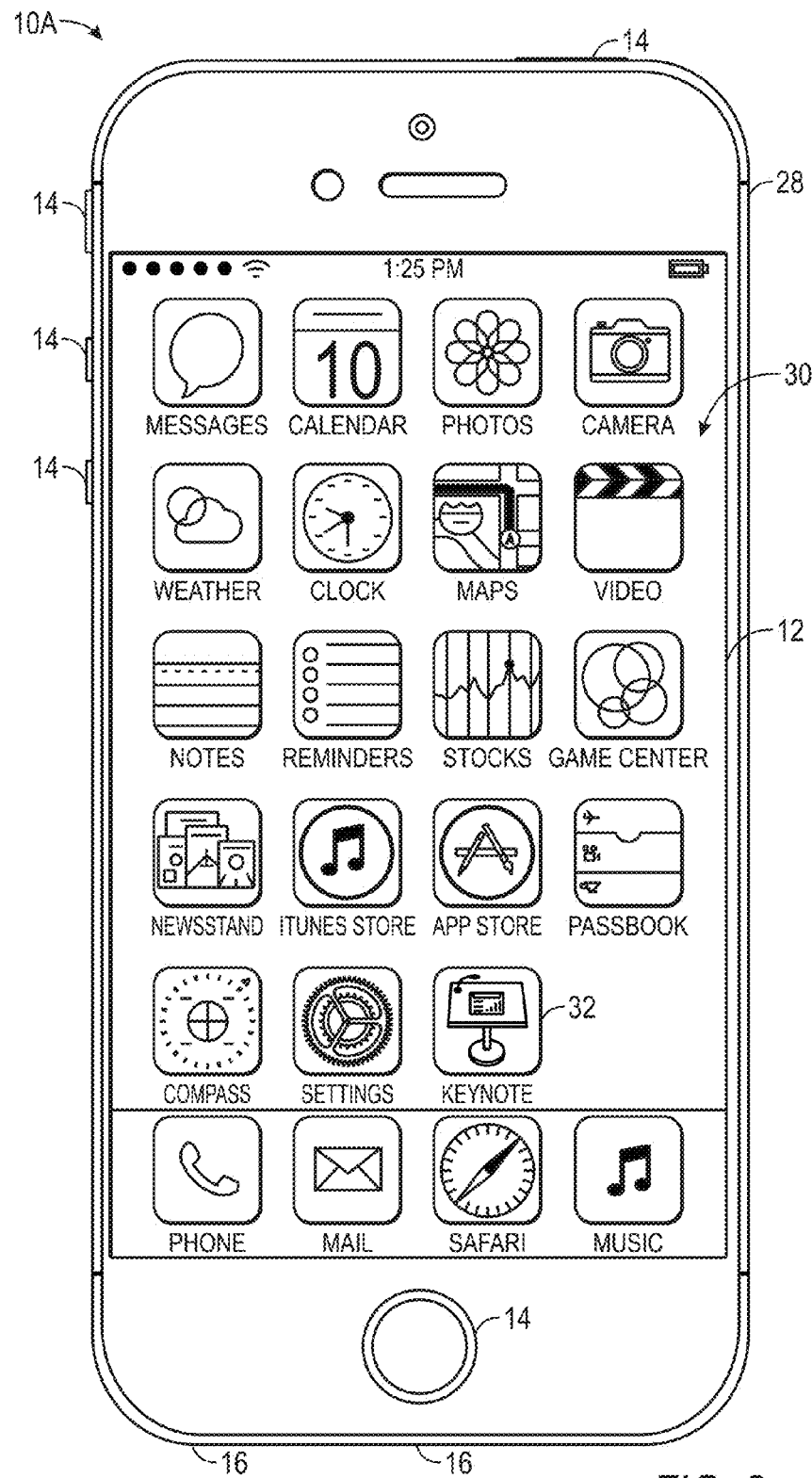
FIG. 2 is a front view of a handheld device, such as an iPhone® by Apple Inc. that may use the techniques disclosed herein, representing an example of the electronic device of FIG. 1, in accordance with an embodiment.
Figure 3:
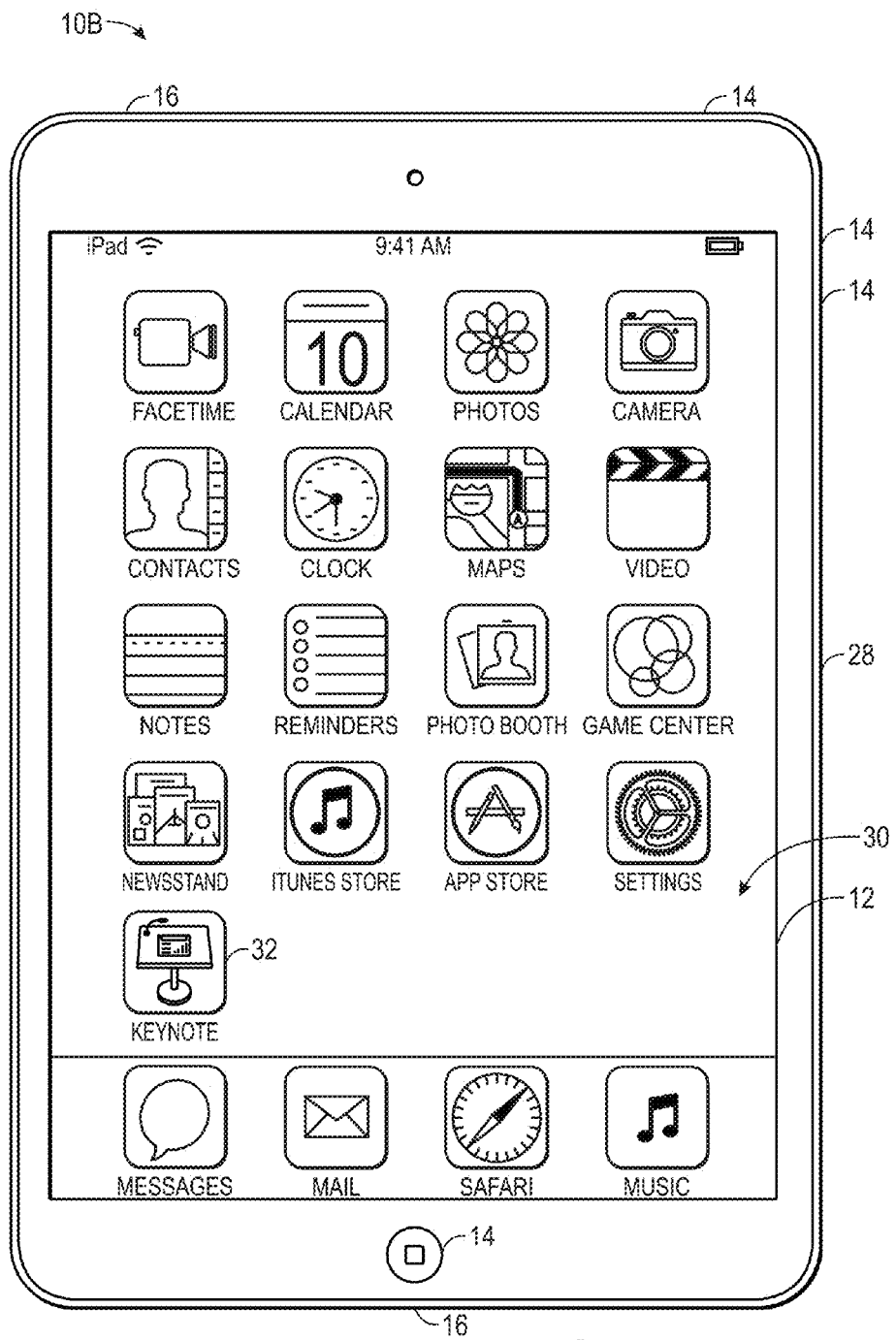
FIG. 3 is a front view of a tablet device, such as an iPad® by Apple Inc. that may use the techniques disclosed herein, representing an example of the electronic device of FIG. 1, in accordance with an embodiment.
Figure 4:
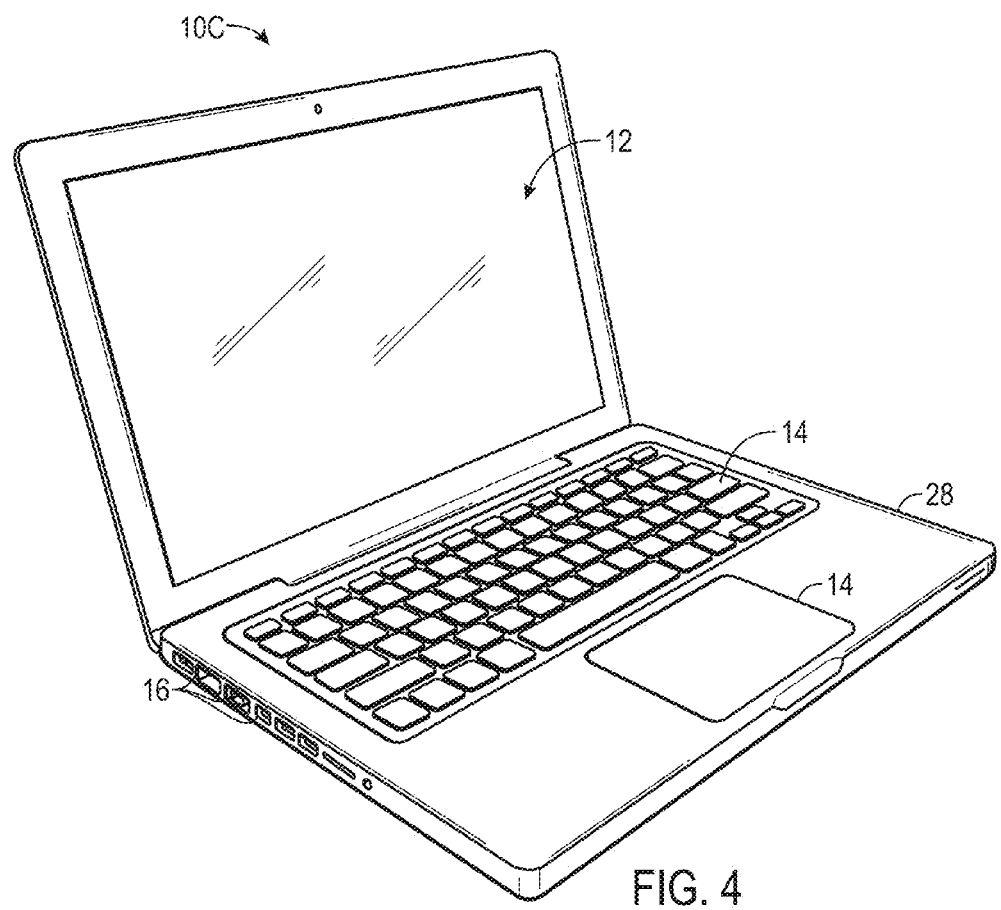
FIG. 4 is a perspective view of a notebook computer, such as a MacBook Pro® by Apple Inc. that may use the techniques disclosed herein, representing an example of the electronic device of FIG. 1, in accordance with an embodiment.

A variety of suitable electronic devices may employ the techniques described herein. FIG. 1, for example, is a block diagram depicting various components that may be present in a suitable electronic device 10. FIGS. 2, 3, and 4 illustrate example embodiments of the electronic device 10, depicting a handheld electronic device, a tablet computing device, and a notebook computer, respectively.

Turning first to FIG. 1, the electronic device 10 may include, among other things, a display 12, input structures 14, input/output (I/O) ports 16, one or more processor(s) 18, memory 20, nonvolatile storage 22, a network interface 24, and a power source 26. The various functional blocks shown in FIG. 1 may include hardware elements (including circuitry), software elements (including computer code stored on a non-transitory computer-readable medium) or a combination of both hardware and software elements. It should be noted that FIG. 1 is merely one example of a particular implementation and is intended to illustrate the types of components that may be present in the electronic device 10. Indeed, the various depicted components (e.g., the processor(s) 18) may be separate components (e.g., graphics processing unit, central processing unit, etc.), components of a single contained module (e.g., a system-on-a-chip device), or may be incorporated wholly or partially within any of the other elements within the electronic device 10. The components depicted in FIG. 1 may be embodied wholly or in part as machine-readable instructions (e.g., software or firmware), hardware, or any combination thereof.

By way of example, the electronic device 10 may represent a block diagram of the handheld device depicted in FIG. 2, the tablet computing device depicted in FIG. 3, the notebook computer depicted in FIG. 4, or similar devices, such as desktop computers, televisions, and so forth. In the electronic device 10 of FIG. 1, the display 12 may be any suitable electronic display used to display image data (e.g., a liquid crystal display (LCD) or an organic light emitting diode (OLED) display). In some examples, the display 12 may represent one of the input structures 14, enabling users to interact with a user interface of the electronic device 10. In some embodiments, the electronic display 12 may be a MultiTouch™ display that can detect multiple touches at once. Other input structures 14 of the electronic device 10 may include buttons, keyboards, mice, trackpads, and the like. The I/O ports 16 may enable electronic device 10 to interface with various other electronic devices.

The processor(s) 18 and/or other data processing circuitry may execute instructions and/or operate on data stored in the memory 20 and/or nonvolatile storage 22. The memory 20 and the nonvolatile storage 22 may be any suitable articles of manufacture that include tangible, non-transitory computer-readable media to store the instructions or data, such as random-access memory, read-only memory, rewritable flash memory, hard drives, and optical discs. By way of example, a computer program product containing the instructions may include an operating system (e.g., OS X® or iOS by Apple Inc.) or an application program (e.g., iBooks® by Apple Inc.).

The network interface 24 may include, for example, one or more interfaces for a personal area network (PAN), such as a Bluetooth network, for a local area network (LAN), such as an 802.11x Wi-Fi network, and/or for a wide area network (WAN), such as a 4G or LTE cellular network. The power source 26 of the electronic device 10 may be any suitable source of energy, such as a rechargeable lithium polymer (Li-poly) battery and/or an alternating current (AC) power converter.

As mentioned above, the electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). FIG. 2 depicts a front view of a handheld device 10A, which represents one embodiment of the electronic device 10. The handheld device 10A may represent, for example, a portable phone, a media player, a personal data organizer, a handheld game platform, or any combination of such devices. By way of example, the handheld device 10A may be a model of an iPod® or iPhone® available from Apple Inc. of Cupertino, Calif.

The handheld device 10A may include an enclosure 28 to protect interior components from physical damage and to shield them from electromagnetic interference. The enclosure 28 may surround the display 12, which may display a graphical user interface (GUI) 30 having an array of icons 32. By way of example, one of the icons 32 may launch an application program (e.g iBooks® by Apple Inc.). User input structures 14, in combination with the display 12, may allow a user to control the handheld device 10A. For example, the input structures 14 may activate or deactivate the handheld device 10A, navigate a user interface to a home screen, navigate a user interface to a user-configurable application screen, activate a voice-recognition feature, provide volume control, and toggle between vibrate and ring modes. Touchscreen features of the display 12 of the handheld device 10A may provide a simplified approach to controlling the application programs. The handheld device 10A may include I/O ports 16 that open through the enclosure 28. These I/O ports 16 may include, for example, an audio jack and/or a Lightning® port from Apple Inc. to connect to external devices. The electronic device 10 may also be a tablet device 10B, as illustrated in FIG. 3. For example, the tablet device 10B may be a model of an iPad® available from Apple Inc.

In certain embodiments, the electronic device 10 may take the form of a computer, such as a model of a MacBook®, MacBook® Pro, MacBook Air®, iMac®, Mac® mini, or Mac Pro® available from Apple Inc. By way of example, the electronic device 10, taking the form of a notebook computer 10C, is illustrated in FIG. 4 in accordance with one embodiment of the present disclosure. The depicted computer 10C may include a display 12, input structures 14, I/O ports 16, and a housing 28. In one embodiment, the input structures 14 (e.g., a keyboard and/or touchpad) may be used to interact with the computer 10C, such as to start, control, or operate a GUI or applications (e.g., iBooks® by Apple Inc.) running on the computer 10C.

Figure 5:
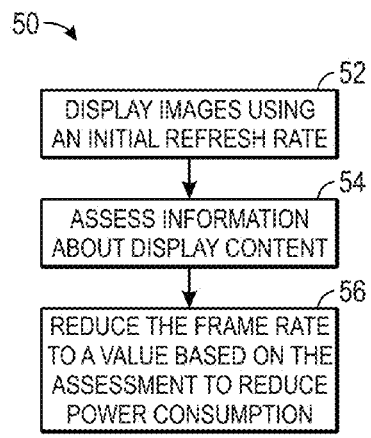
FIG. 5 illustrates a flow diagram view of a process for reducing a refresh rate of a display such as the display of the electronic device of FIG. 1, in accordance with an embodiment.

With the preceding in mind, FIG. 5 illustrates a process 50 for operating a display of an electronic device by reducing a refresh rate of the display to reduce power consumption. In some embodiments, the process 50 begins with a processor(s) 18 (e.g., display controller, GPU) causing the display images on a display using an initial refresh rate for the display (block 52). One or more of the processor(s) 18 assess information about display content (block 54). For example, as discussed below, the processor(s) 18 may determine grayscale level values and/or spatial distributions of some of the grayscale level values. After the assessment, the processor(s) 18 reduce the frame rate to a value based on the assessment to reduce power consumption (block 56). In some embodiments, the assessment is used to determine a refresh rate that reduces power consumption without causing the display to visibly flicker. Moreover, although the foregoing discussion contemplated embodiments of the process 50 that begins displaying images at an initial refresh rate, some embodiments may assess and determine a refresh rate prior to displaying any images. In other words, in such embodiments, the assessment is performed prospectively, and no portion of the images are displayed at a refresh rate other than the refresh rate determined based on the assessment.

Figure 6:
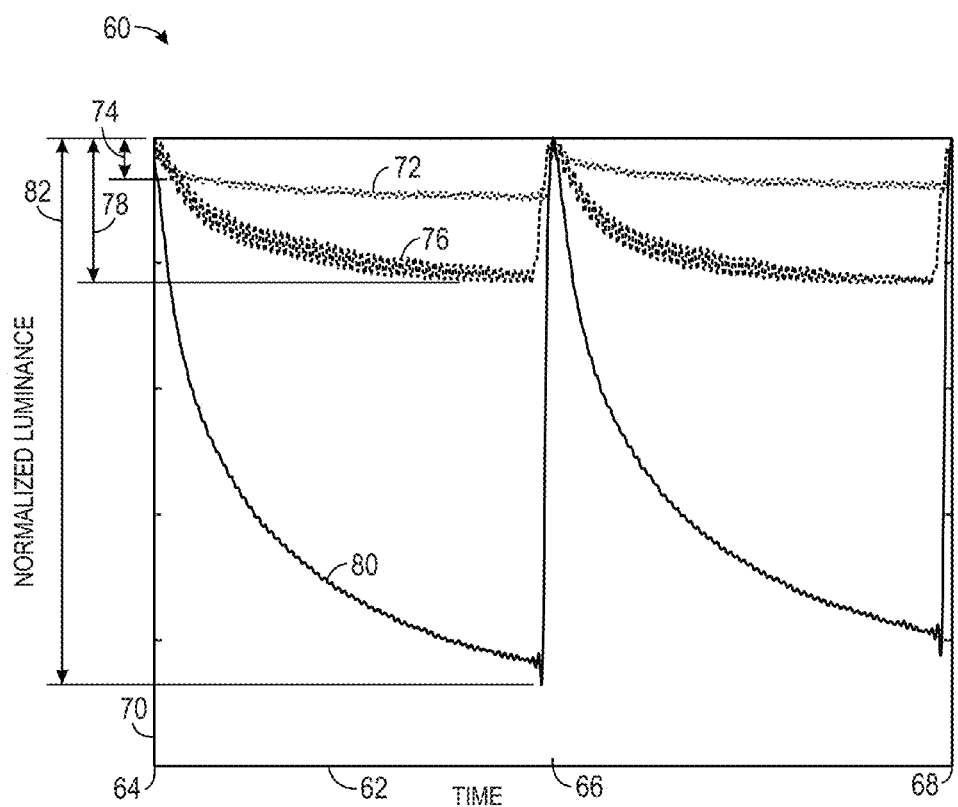
FIG. 6 illustrates a graphical view of luminance levels for various grayscale levels over time between refresh rates, in accordance with an embodiment.

Although reducing the refresh rate decreases power consumption, a lowered refresh rate even for static images may result in a visible flicker of a screen due to luminance drops between refreshes in certain situations. For example, the LCD pixels of a display may pass through less light the longer the LCDs have been active after a refresh of the screen based on a grayscale level value of the pixel. Furthermore, the luminance drop of a FIG. 6 depicts a graph 60 that illustrates luminance drop of pixels between refresh rates. As depicted, the graph 60 includes an abscissa 62 indicative of duration of time between refreshing of display at refresh times 64, 66, and 68. Furthermore, the graph 60 includes an ordinate 70 that corresponds to normalized luminance of pixels. For example, the normalized luminance may include a percent of a maximum luminance of a pixel at a corresponding grayscale level. As illustrated, a relatively high value grayscale level 72 (e.g., 255) experiences a relatively low luminance drop 74 (e.g., about 0.5%) between refresh times 64 and 66 and between refresh times 66 and 68. Similarly, a relatively low value grayscale level 76 (e.g., 16) experiences another relatively low luminance drop 78 (e.g., about 1%) between refresh times 64 and 66 and between refresh times 66 and 68. However, a medium grayscale level 80 (e.g., 128) may have a relatively high luminance drop 82 (e.g., about 4%) between refresh times 64 and 66 and between refresh times 66 and 68.

Figure 7:
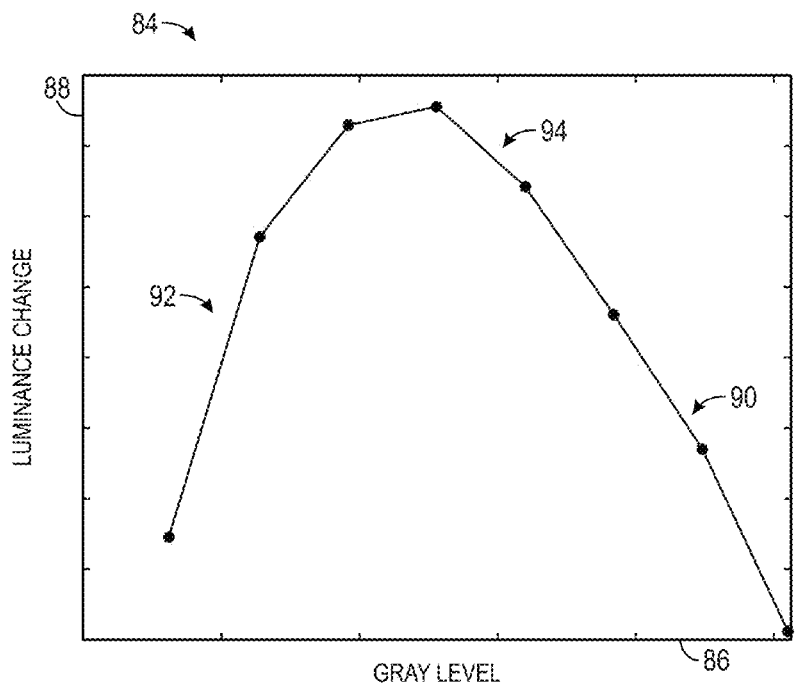
FIG. 7 illustrates a graphical view of luminance drop for grayscale levels at a constant refresh rate, in accordance with an embodiment.

FIG. 7 depicts a graph 84 illustrating normalized luminance changes of pixels based on grayscale level values based on a constant refresh rate. As illustrated, the graph 84 includes an abscissa 86 that corresponds to various grayscale levels (e.g., 16 to 255) and an ordinate 88 that corresponds to luminance changes between refreshes of the display. As illustrated, relatively high grayscale levels 90 and relatively low grayscale levels 92 each have relatively low luminance change between refreshes while medium grayscale levels 94 have a relatively high luminance change between refreshes. The relatively high drop in luminance of medium value grayscale level pixels between refreshes may cause a display to visibly flicker when a refresh rate is reduced. This visible flicker may result when the refresh rate is low enough to cause the pixels corresponding to medium value grayscale levels to lose enough luminance that the appearance becomes visible on the screen. Accordingly, in some displays, the refresh rate when displaying images with medium grayscale levels (e.g., 51-199) may be higher (e.g., 30 Hz) than images having only relatively high (e.g., 0-50) and/or relatively low grayscale levels (e.g., 200-255). In other words, images having only relatively high and/or relatively low grayscale levels may have a corresponding refresh rate lower (e.g., 1 Hz to 15 Hz) than images having medium grayscale levels.

In some embodiments, the categorization of grayscale may be dynamic, based on a desired level of quality of appearance of the display and/or power savings. In other words, in some embodiments, a power savings mode or display quality mode may be enabled that corresponds to classification of more grayscale levels as relatively high or relatively low grayscale levels. For example, power savings mode may increase power savings by trading off display quality by increasing the number of grayscale levels designated as high or low grayscale levels. On the other hand, a display quality mode would ensure display quality by trading off power savings by decreasing the number of grayscale levels designated as high or low gray scale levels. For example, in some embodiments, in a display quality mode, the high and low grayscale levels may be the highest and lowest 10 grayscale levels such that all pixels between 9 and 245 are designated as medium grayscale levels, but in a power savings mode, the high and low grayscale levels may be the highest and lowest 50 or 100 grayscale levels such that all pixels between 49 and 205 or 99 and 155 are designated as medium grayscale levels. Although the foregoing discusses high grayscale levels and low grayscale levels having the same size, in some embodiments, the number of levels designated as low grayscale levels may be more than or less than the number of grayscale levels designated as high grayscale levels. For example, in some embodiments, the low grayscale levels may include the lowest 50 grayscale levels while the high grayscale levels may include the highest 25 grayscale levels.

In some embodiments, a user may select the display quality mode or the power savings mode using the input structures 14. In certain embodiments, the processor 18 may select the display quality mode or the power savings mode based on power availability. For example, in some embodiments, the processor 18 may activate a power savings mode when no external power is provided, but the processor 18 may activate a display quality mode when external power is provided. Furthermore, the processor 18 may activate a power savings mode when an internal power supply (e.g., battery) is running low on power. For example, in some embodiments, the processor 18 may activate the power savings mode when a battery has less than 50%, 33%, 20%, or less percent charge.

Figure 8:
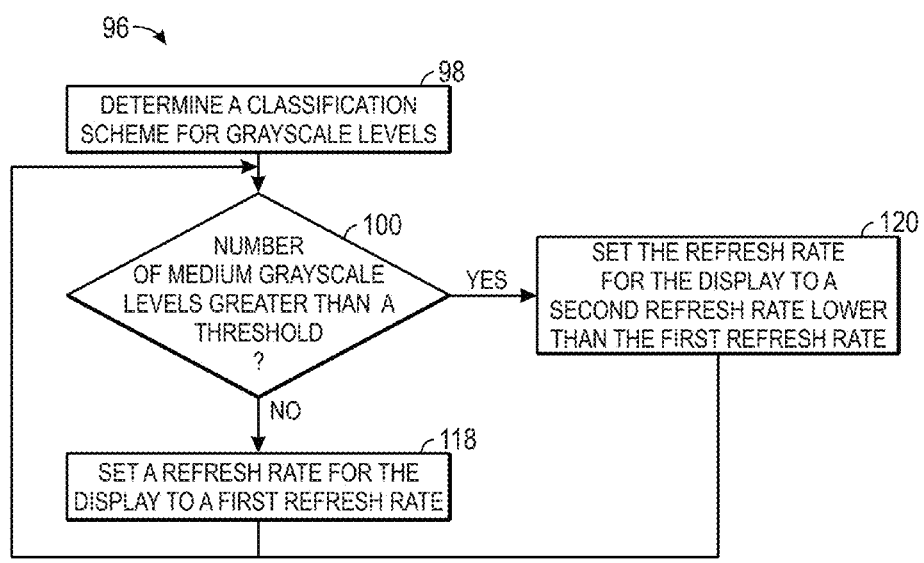
FIG. 8 illustrates a process for operating an electronic display, in accordance with an embodiment.
Figure 9:
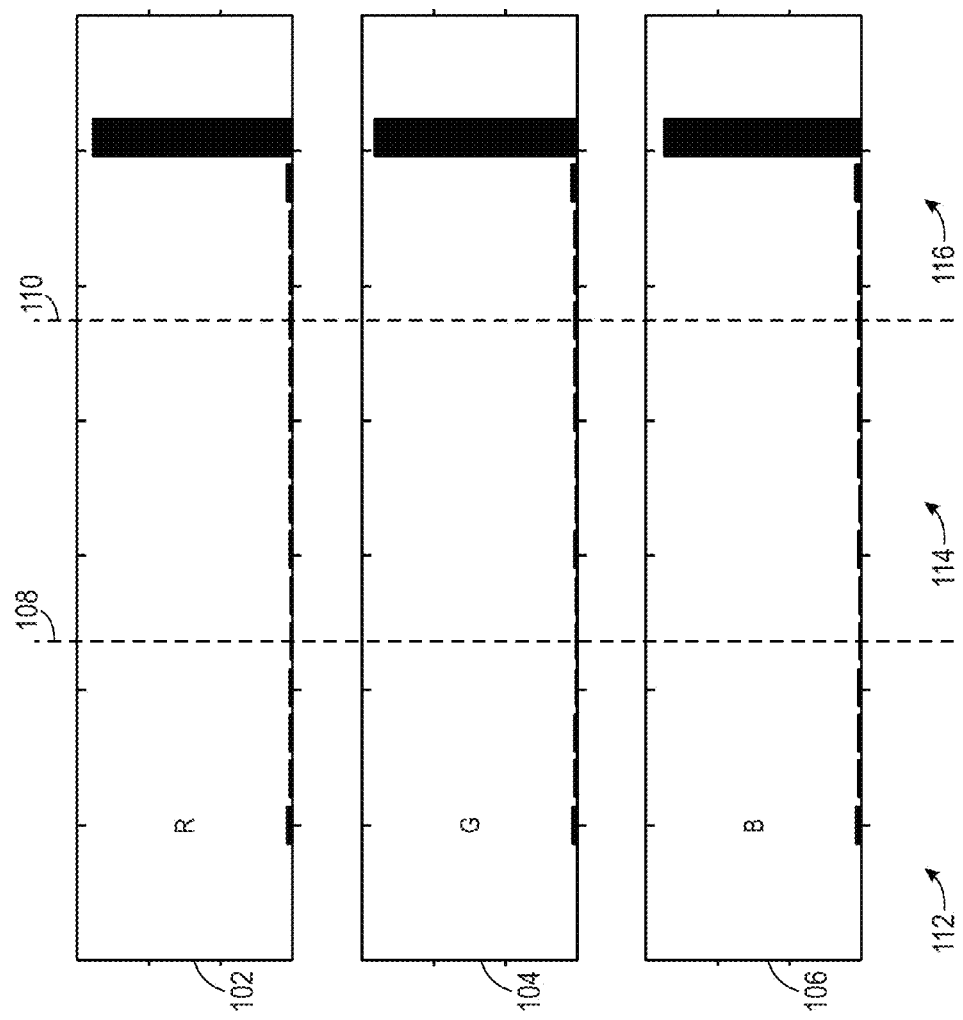
FIG. 9 illustrates a histogram for an image to be displayed on an electronic display, in accordance with an embodiment.

FIG. 8 illustrates a process 96 for determining a refresh rate based at least in part on whether any grayscale levels are located in a medium grayscale level. The process 96 includes determining a classification scheme for grayscale levels (block 98). For example, in some embodiments, the processor 18 may determine cutoff points for the low, medium, and high grayscale level classifications. In some embodiments, the processor 18 may determine the cutoff points based at least in part on an activation of a power savings mode or display quality mode. As previously discussed, more grayscale levels may be designated as medium level grayscale levels in the display quality mode than the power savings mode. Upon determination of which levels would be classified as medium grayscale levels, the processor 18 determines whether more than a threshold of pixels corresponding to the medium grayscale levels are present (block 100). For example, the processor 18 may use histograms of grayscale levels, such as the histograms 102-106 of FIG. 9 to determine a number of pixels present in the designated grayscale levels. In some embodiments, the processor 18 may evaluate histograms for each color. For example, the processor 18 may create and/or evaluate histogram 102 for red pixels, histogram 104 for green pixels, and histogram 106 for blue pixels. In the evaluation, the processor 18 uses the classification scheme previously determined in block 100 to determine cutoffs 108 and 110. Based on the cutoff values, grayscale levels in the low region 112 may be classified as low grayscale levels, grayscale levels in the middle region 114 may be classified as medium grayscale levels, and grayscale levels in the high region 116 may be classified as high grayscale levels. In other words, the processor 18 determines whether a count of levels in the middle region 114 exceeds a threshold. For example, in some embodiments, the threshold may be based on a total number of pixels, such as a single pixel, five pixels, ten pixels, or more. In certain embodiments, the threshold may be based on a percentage of pixels, such as more than 1%, 5%, or 20% of pixels.

In certain embodiments, multiple thresholds may be used such that ranges of numbers of pixels having grayscale levels in the middle region 114 each have corresponding refresh rates. For example, in some embodiments, when the number of pixels having grayscale levels in the middle region 114 is under the first lowest threshold, the refresh rate may be set to 1 Hz or lower. Between a second and third threshold, the refresh rate may be set to 5 Hz. Similarly, 10 Hz, 20 Hz, and 30 Hz may be used for the refresh rate when the number is between the third and a fourth threshold, between the fourth and a fifth threshold, and above the fifth threshold, respectively.

When the processor 18 evaluates the histograms 102-104, the processor 18 may analyze each histogram individually or may analyze the histograms together. Moreover, when the processor 18 evaluates the middle region 114 of the histograms 102-106 of FIG. 9, the processor 18 may determine that the threshold has not been surpassed. Returning to FIG. 8, when the threshold is not surpassed, the processor 18 sets a first refresh rate for the refresh rate of the display 12 (block 118). In other words, images with no or relatively low numbers of medium grayscale values (e.g., ebooks, documents, emails, etc.) may be displayed using a relatively low refresh rate.

Figure 10:
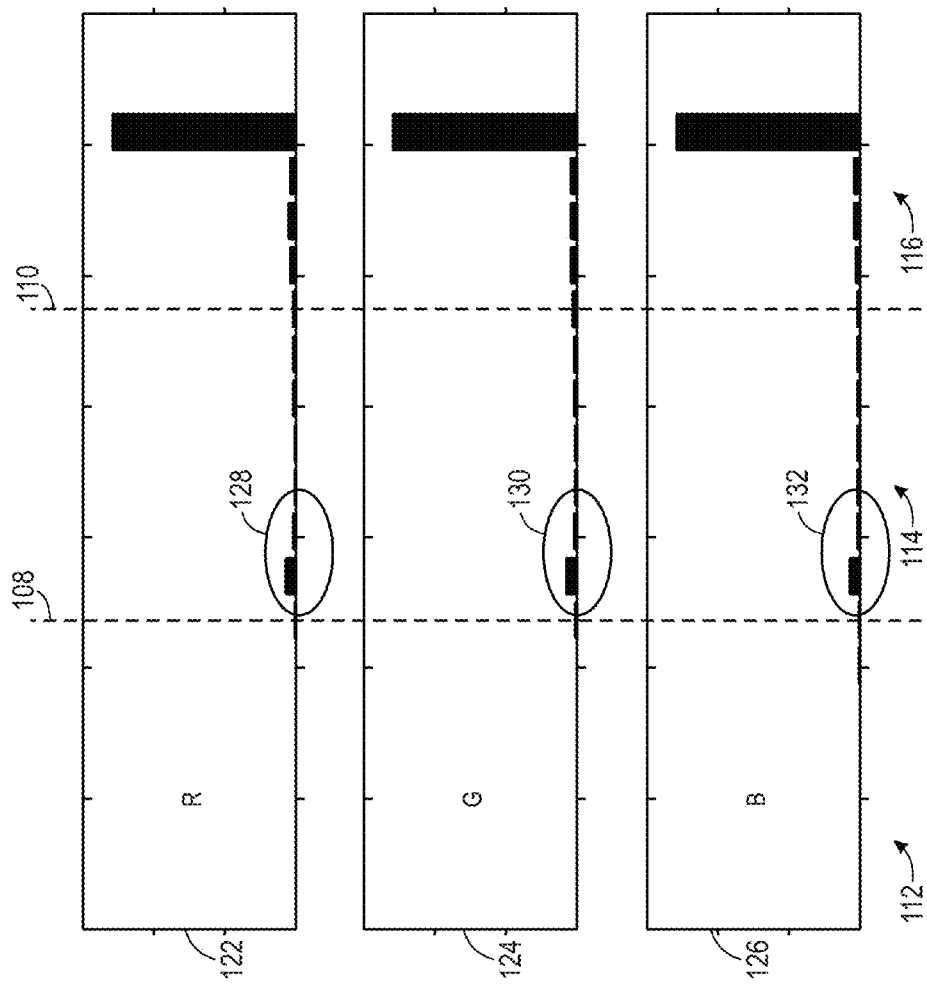
FIG. 10 illustrates a histogram of an alternative image with grayscale text and/or page borders, in accordance with an embodiment.

When the processor 18 analyzes one or more histograms with more medium grayscale levels than the threshold, the processor 18 may set a higher refresh rate for the display 12 (block 120). An embodiment of histograms having medium grayscale values above the threshold are illustrated in FIG. 10. As depicted, the histograms 122, 124, and 126 each include a number of medium grayscale levels that exceed the threshold. For example, each of the regions 128, 130, and 132 include more medium grayscale levels than the threshold. In the illustrated embodiment, the processor 18 may determine that the threshold is surpassed by one group of grayscale levels that includes multiple levels within the middle region 114 pixels. In other words, the grayscale levels may be subdivided within the regions 112-116 for tabulation. In other embodiments, the processor 18 may determine that the threshold is surpassed by a calculation of the total number of medium grayscale levels in the middle region 114 from one histogram or any combination of histograms. In certain embodiments, the processor 18 may determine that the threshold is surpassed by tabulation of individual grayscale levels. In summary, in an electronic device implementing the process 96, an image or frame having the histograms 102-106 may be displayed on the display 12 at a lower refresh rate than an image or frame of video having the histograms 122-126.

Additionally, in some embodiments, the processor 18 may determine a refresh rate for the display 12 continually. In other embodiments, the processor 18 may determine a refresh rate for the display based on changes in content. For example, if the content being displayed on the display 12 is an electronic book (i.e., ebook), the processor 18 may determine a refresh rate for the display 12 each time that a page is turned or a turn request has been received via the input structures 14. In some embodiments, the processor 18 may determine a refresh rate for the display 12 each time an image to be displayed on the display 12 changes. The refresh rate may be determined before, during, or after the image is changed (e.g., new image, scrolling through a webpage, etc.). Additionally or alternatively, the processor 18 may determine a refresh rate for the display more frequently when some application programs are running. For example, in some embodiments, if a movie application is running, a refresh rate may be determined more often or disabled entirely. However, if an ebook application is running, a refresh rate for the display 12 may be determined less frequently.

Figure 12:
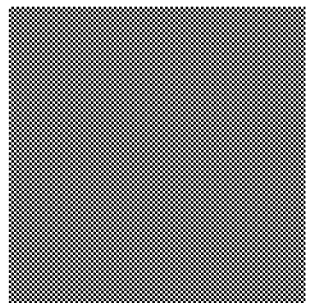
FIG. 12 illustrates a square that may be displayed on the display of the electronic device of FIG. 1, in accordance with an embodiment.
Figure 13:
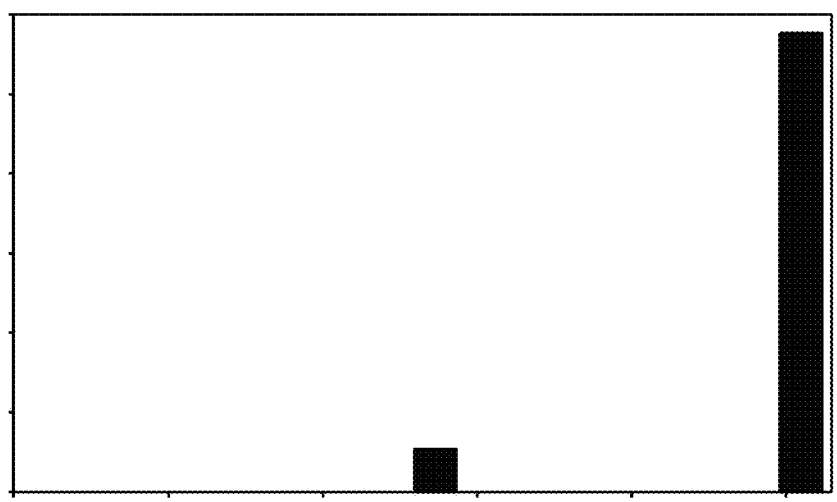
FIG. 13 illustrates a histogram illustrating grayscale values for the page of FIG. 10 and the square of FIG. 11, in accordance with an embodiment.
Figure 14:
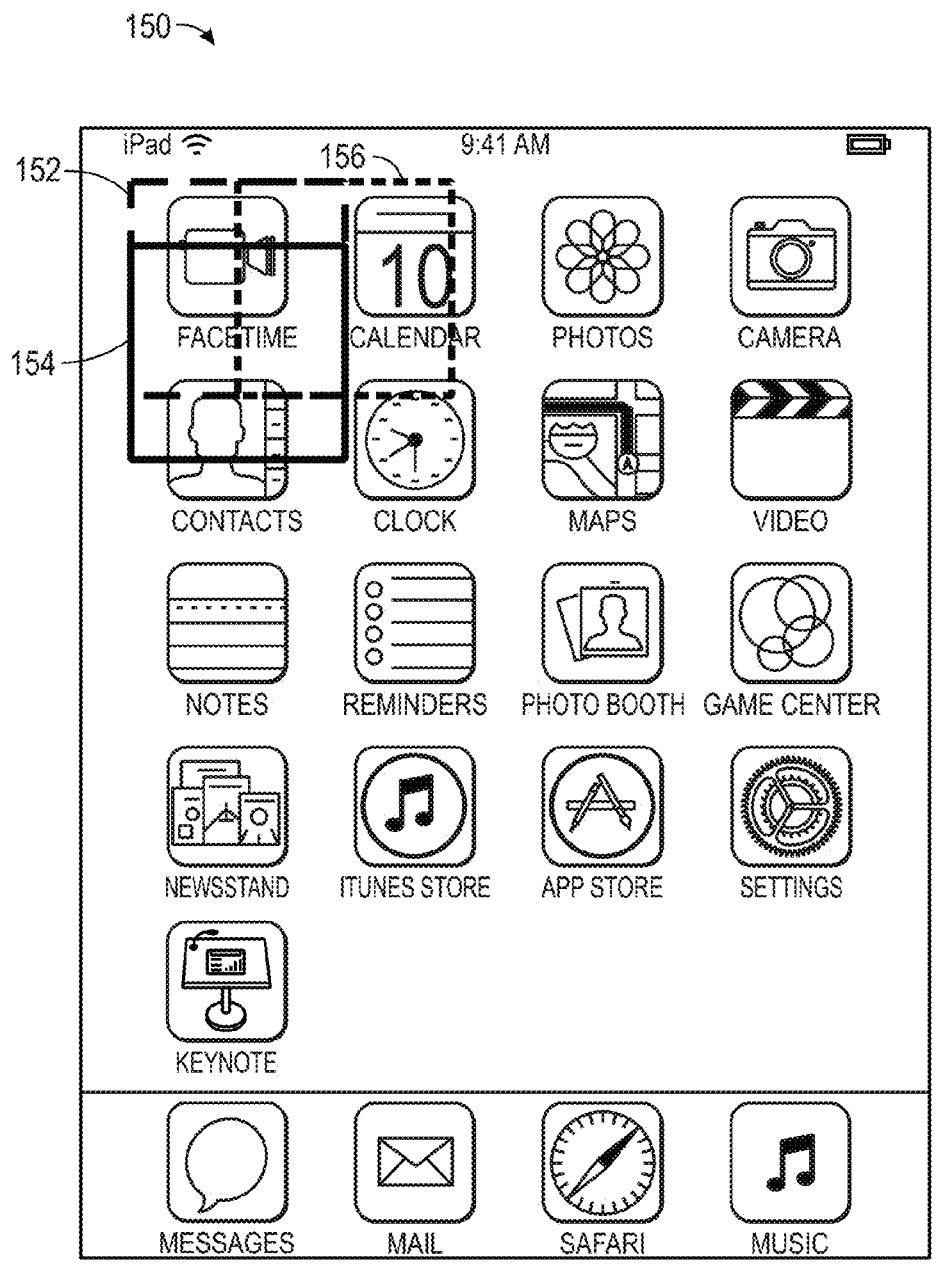
FIG. 14 illustrates blocks sub-dividing an image to be displayed on the display of the electronic device of FIG. 1, in accordance with an embodiment.

Although histograms may be used to determine refresh rates, histograms may not address some causes of flicker due to reduced refresh rates. For example, a histogram does include spatial distribution information about grayscale levels in an image or frame of video that may change noticeability of a flicker of the display in relation to a refresh rate. For example, FIG. 11 illustrates a page 134 of a text document or ebook having text with a color that is equivalent to the color of a square 136 illustrated in FIG. 12. Histogram 138 of FIG. 13 may be used to represent grayscale levels in both the page 134 and square 136. Although the page 134 and the square 136 have the same histogram, when the display 12 displays the page 134, the display 12 may have little to no noticeable flicker that may not more noticeable when the display 12 displays the square 136. The display 12 may have more noticeable flicker when displaying the square 136, because the square 136 does not spatially distribute medium gray levels throughout the screen as the page 134 does. By gathering the medium gray levels together, the square 136 may result in considerably more flicker than the page 134. To account for spatial distribution, the processor 18 may subdivide an image or frame of video into, such as the subdivision of image 150 into overlapping blocks, such as the blocks 152, 154, and 154. Overlapping blocks may be used to analyze the entire image 150. By analyzing smaller blocks of the image 150, the processor 18 may determine whether a lower or higher refresh rate should be used when displaying the image.

Figure 15:
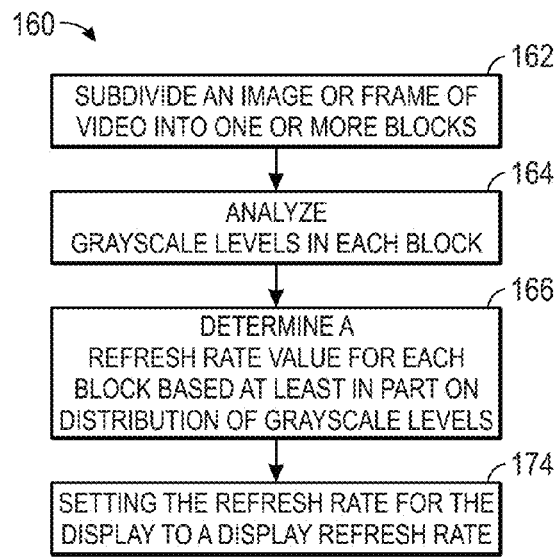
FIG. 15 illustrates a block diagram view of a hierarchical block analysis process that may be used to vary a refresh rate of the display of the electronic device of FIG. 1, in accordance with an embodiment.

FIG. 15 illustrates a process 160 for operating a display. The processor 18 subdivides an image or frame of video into one or more blocks (block 162). In some embodiments, the one or more blocks may overlap with one another. After the image has been subdivided, the processor 18 analyzes grayscale levels of each block to determine a distribution of grayscale levels (block 164). Using the analysis, the processor 18 determines a refresh rate value for each block based at least in part on the distribution of grayscale levels (block 166).

Figure 16:
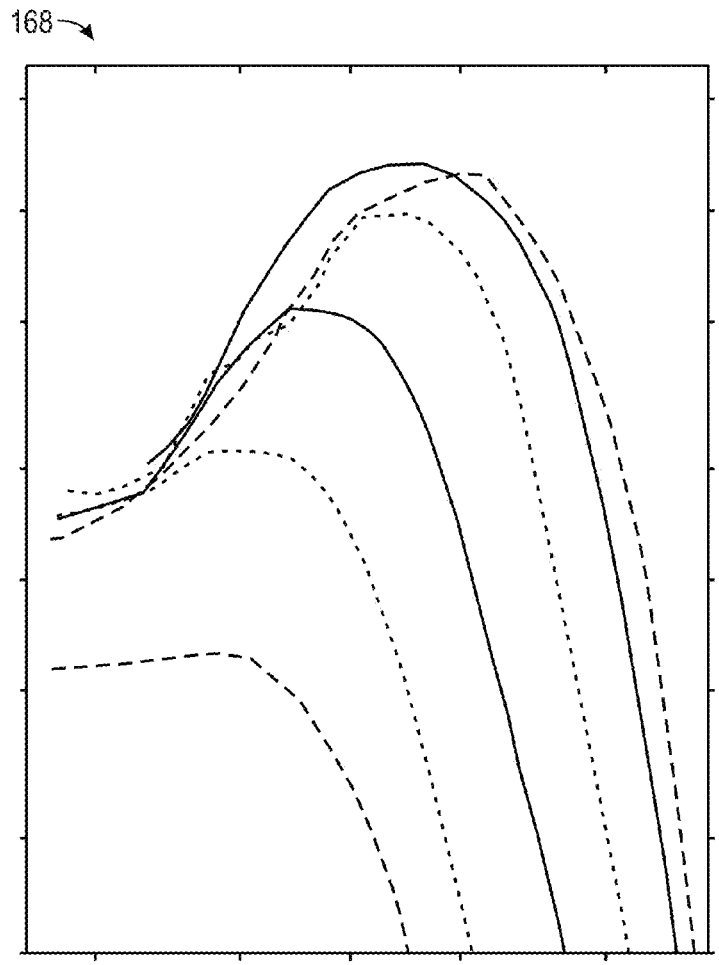
FIG. 16 illustrates a graph of frequency sensitivities that may be used in determining a refresh rate for a block, in accordance with an embodiment.
Figure 17:
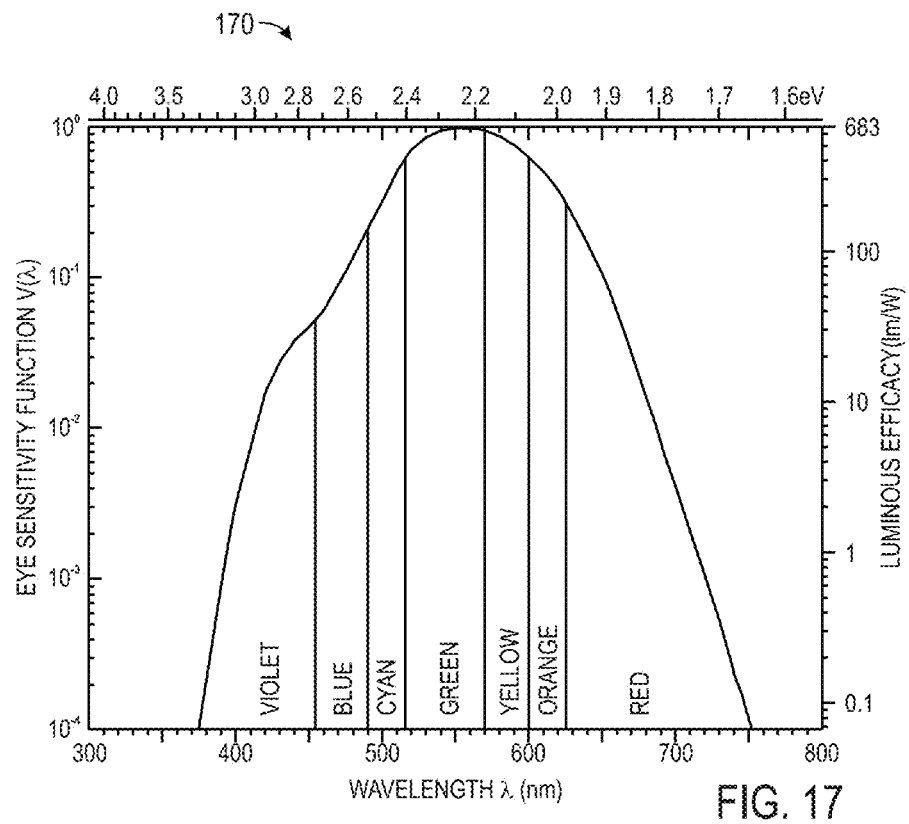
FIG. 17 illustrates a graph of color sensitivities that may be used in determining a refresh rate for a block, in accordance with an embodiment.

For example, in some embodiments, the processor 18 may access a frame buffer for the display 12 to determine various details about the image. In certain embodiments, the processor 18 may use the following equation to determine a refresh rate value for each block:

$$\theta_{avg}(\text{block}, fr) = \frac{\alpha_f(G, BL, fr)\sum \alpha_{rgb}\alpha_{br}(g, BL)\theta(g, fr)\gamma(g)}{\sum \alpha_{rgb}\gamma(g)}, \quad \text{(Equation 1)}$$

where $\theta_{avg}(\text{block}, fr)$ is the refresh rate for a block; $\alpha_f(G, BL, fr)$ is a temporal contrast sensitivity function (TCSF) based on a global grayscale level G, a backlight setting BL, and a target frame rate fr; $\alpha_{rgb}$ is a color sensitivity used to weight summation of values based on color; $\alpha_{br}(g, BL)$ is a pixel brightness sensitivity based on a grayscale level of the pixel g and the backlight setting BL; $\theta(g, fr)$ is a percent of luminance change based on the grayscale level of the pixel g and the refresh rate; and $\gamma(g)$ is the gamma curve. In certain embodiments, the TCSF may be determined using TCSF graph 168 depicted in FIG. 16. For example, TCSF values may be stored in a lookup table based on global grayscale levels, backlight values, and target refresh rates. Similar to the TCSF, color sensitivity may be determined using the color sensitivity graph 170 illustrated in FIG. 17. In some embodiments, values may be selected for weighting red, green, and blue values. For example, in certain embodiments, red, green, and blue values may be weighted according to Table 1 below:

TABLE 1

Example color sensitivity values.

| Red | 0.3 |
|---|---|
| Green | 1 |
| Blue | 0.3 |

Figure 18:
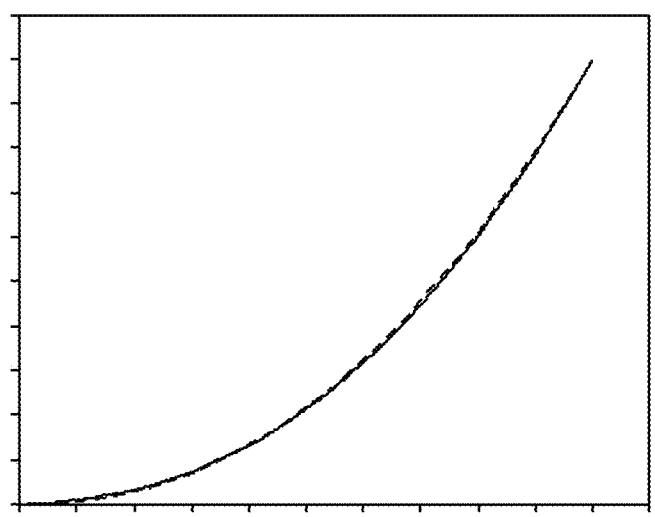
FIG. 18 illustrates a graph of a gamma curve that may be used in determining a refresh rate for a block, in accordance with an embodiment.

In other embodiments, other values may be selected using the graph 170 or other suitable color sensitivity values, such as red values between 0.1 and 0.5, green values between 0.8 and 1.0, and blue values between 0.1 and 0.5. Finally, gamma curve values $\gamma(g)$ may be determined using any suitable transformation function, such as transformation function 172 of FIG. 18.

In some embodiments, analysis of the blocks may be performed without a frame buffer by using line buffers or tapping a pixel pipeline without altering pixel content. For example, in some embodiments, during a scan of an image, the processor 18 may determine and track which pixels in each block of a scanned line should be classified in the regions 112, 114, and/or 116 by storing indications of cumulative grayscale region information in the memory 20. In some embodiments, the processor 18 may only track a percentage of pixels with grayscale levels in the middle region 114. In other embodiments, the processor 18 may track two or more regions. Upon determination of the distribution of grayscale levels within each block, a refresh rate may be determined. For example, in some embodiments, if all pixels have grayscale levels in the low region 112 or the high region 116, a refresh rate for the block may be set to a relatively low value (e.g., 1 Hz or lower). However, if grayscale levels are narrowly distributed in the middle region 114, the appearance of the middle grayscale levels may be adjusted using backlight compensation. In other words, in some embodiments, the backlight may be reduced while the grayscale levels are increased such that the grayscale levels allow for a lower refresh rate without increasing flicker or substantially changing the appearance the image being displayed. Moreover, if the grayscale levels are substantially distributed through all regions 112-116, a higher refresh rate (e.g., 30 Hz) may be set for the region. In certain embodiments, when grayscale levels are primarily located in the high region 116 with some grayscale levels in the middle region 114, the block may be tagged as to be determined using local distributions by further subdivision of the block, as discussed below in reference to FIG. 19. Additionally or alternatively, a block may be tagged for further subdivision if a number of grayscale levels in the middle region 114 is above a threshold.

Returning to FIG. 15, once a refresh rate has been assigned to each of the blocks, the processor 18 may set a refresh rate for the display 12 to a display refresh rate (block 174). In some embodiments, the processor 18 may set the display refresh rate to a highest refresh rate of any blocks. Alternatively, the processor 18 may set the display refresh rate to a weighted or non-weighted average of values. For example, in some embodiments, if a power savings mode has been enabled, the processor 18 may weight low refresh rate blocks as heavy or more heavily than high refresh rate blocks.

Figure 19:
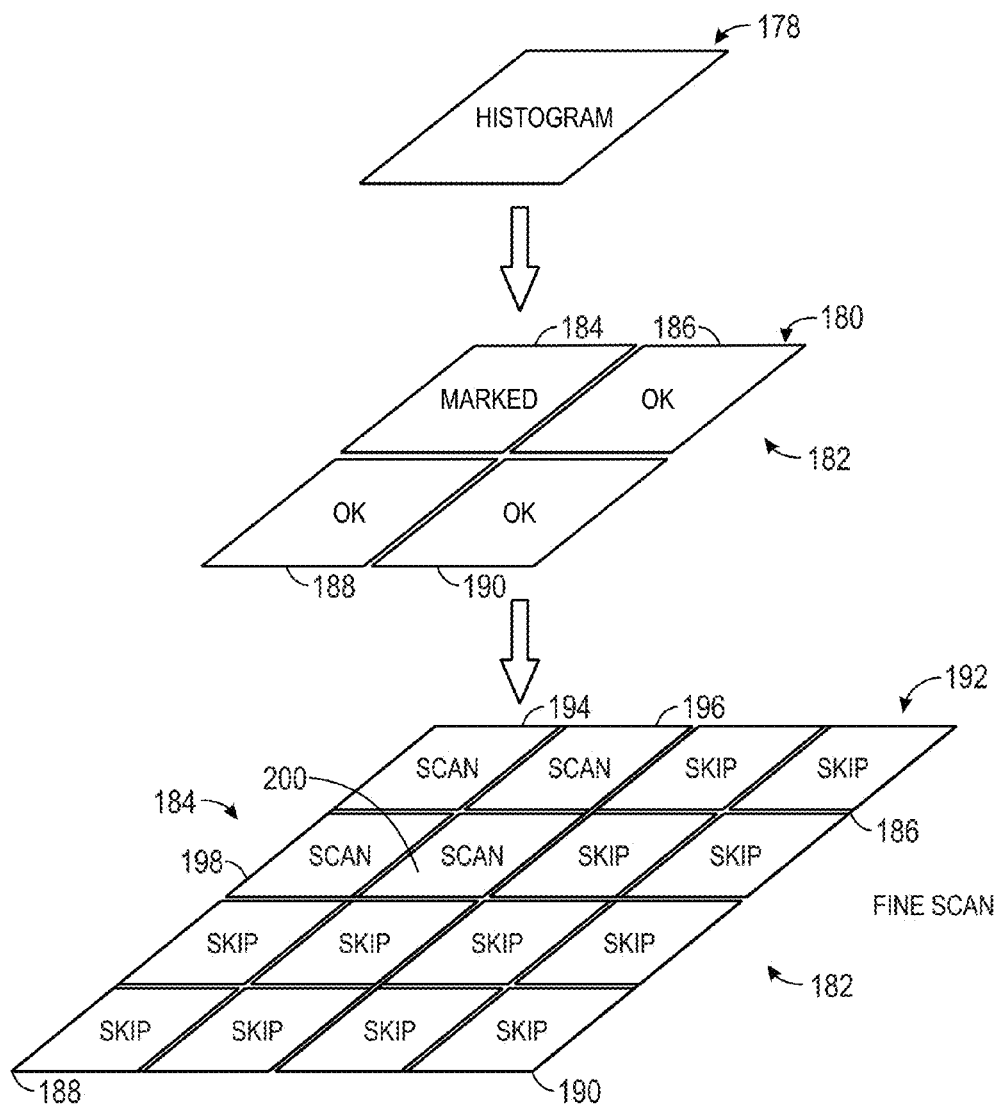
FIG. 19 illustrates an example of a hierarchical process for determining a variable refresh rate based on grayscale levels in multiple scans, in accordance with an embodiment.

FIG. 19 illustrates a hierarchical analysis that may be employed in operating the display 12. The hierarchical analysis 176 includes a histogram analysis 178 that includes analyzing a histogram of an image to determine whether a threshold of grayscale levels in the middle region 114 have been surpassed. If the threshold has not been surpassed, further analysis may be avoided. However, if the threshold has been surpassed, in some embodiments, a coarse analysis 180 may be performed by subdividing an image 182 into blocks 184, 186, 188, and 190. During analysis of each block in the coarse analysis, some blocks may be have refresh rate values determined without further analysis, such as when a threshold for grayscale levels is surpassed for the blocks. In the illustrated embodiment, the blocks 186, 188, and 190 have refresh rates set to a relatively low value (e.g., 1 Hz or less). In some embodiments, further analysis using a fine analysis 192 may be performed on blocks (e.g., 184) that may not be assigned the relatively low refresh rate during the coarse analysis. These blocks may be further divided into smaller blocks 194, 196, 198, and 200 for further analysis. In some embodiments, these blocks may be assigned the relatively low refresh rate, further subdivided and analyzed, or assigned a higher refresh rate than the relatively low refresh rate (e.g., 30 Hz). As illustrated, during analysis (e.g., fine analysis 192) subsequent to the coarse analysis 180, blocks 186, 188, and 190 may be skipped.

Figure 20:
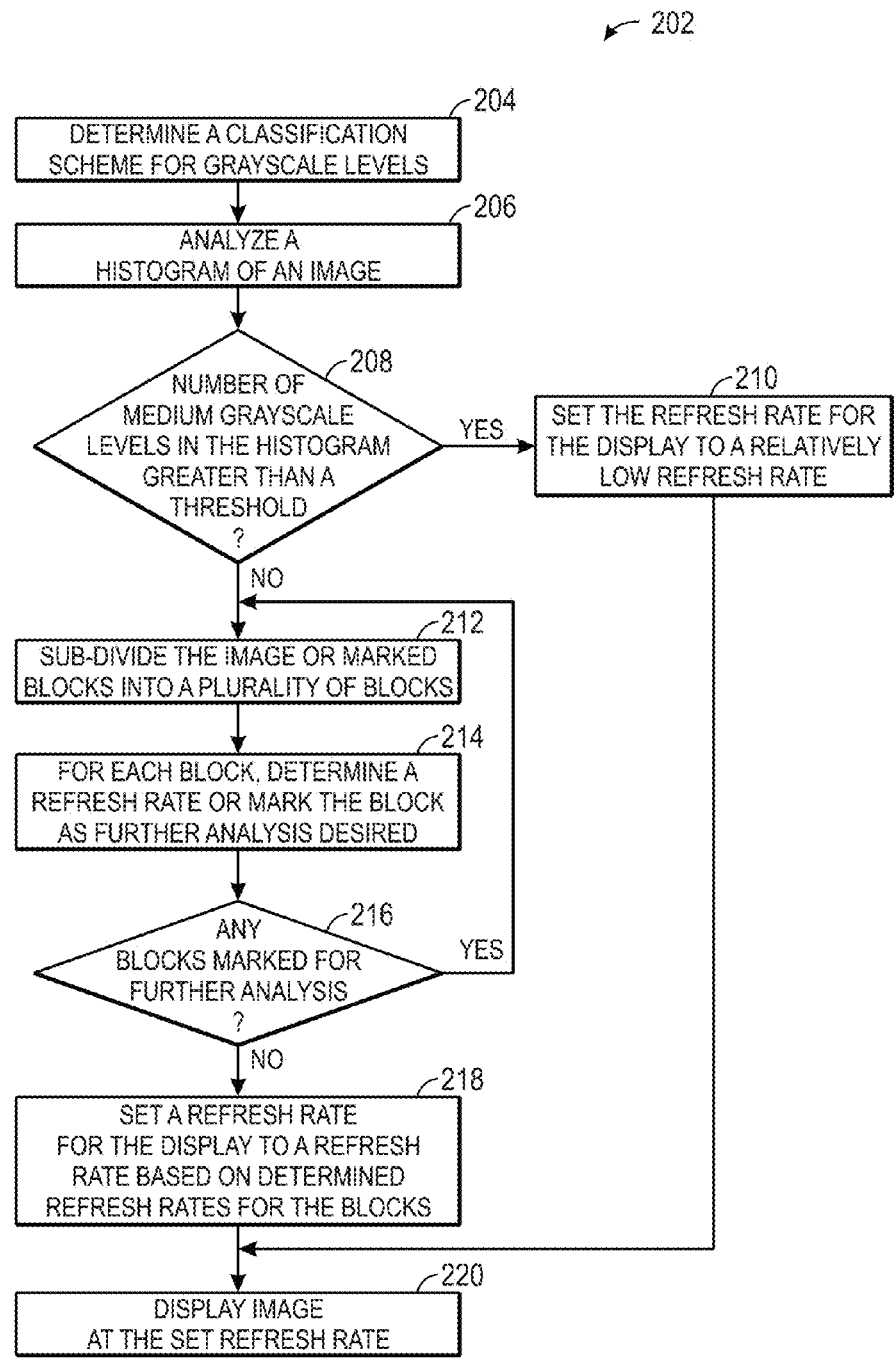
FIG. 20 illustrates an example of a process for determining a variable refresh rate based on grayscale levels using a histogram as a preliminary scan.

FIG. 20 illustrates a process 202 for operating a display, such as the display 12, in accordance with an embodiment. The process 202 begins with determining a classification scheme for grayscale levels (block 204). As previously discussed, the processor 18 may determine low, middle, and high regions of a histogram based on a preset value, a selected mode, or other suitable methods of determining areas where flicker might occur when a relatively low refresh rate is used. Once a classification scheme has been determined, the processor 18 analyzes a histogram for an image by classifying whether each grayscale level is in the low, middle or high regions of the histogram (block 206). Next, the processor 18 determines whether a number of medium grayscale levels has exceeded a threshold value (block 208). If during analysis, the processor 18 determines that a threshold value for medium grayscale levels has not been surpassed, the processor 18 sets a refresh rate for the display to a relatively low refresh rate (block 210). If during analysis, the processor 18 determines that a threshold value for medium grayscale levels has been surpassed, the processor 18 subdivides an image into a plurality of blocks to be independently analyzed (block 212). In some embodiments, the blocks may be rectangular in shape. In certain embodiments, the blocks may overlap each other. During analysis of each block, the processor 18 may determine a refresh rate or mark the block as further analysis desired (block 214), as previously discussed. After each block has been marked or assigned a refresh rate, the processor 18 determines whether any blocks have been marked for further analysis (block 216). If any blocks are marked for further analysis, the processor 18 subdivides the block into smaller blocks and continues analysis as described in reference to block 214. If no blocks are marked for further analysis, the processor 18 sets a refresh rate for the display to a refresh rate based on determined refresh rates for the blocks (block 218). For example, the processor 18 may use any of the previously described methods to determine a refresh rate for the display. Once the refresh rate for the display is determined, the processor 18 causes the display 12 to display the image at the set refresh rate (block 220). In some embodiments, displaying the image may include continuing to display the image. For example, in some embodiments, the refresh rate determination may be performed after an image has begun being displayed. Additionally or alternatively, the refresh rate determination may be made prior to a display of an image via the display 12.

Although the foregoing discussion refers to how a processor may operate a display, in some embodiments, the display 12 may be controlled by other hardware of the electronic device 10. For example, in certain embodiments, a system on a chip may be used to implement the previously discussed refresh rate determination and setting of the refresh rate. Additionally or alternatively, the refresh rate may be set and determined using software. For example, the processor 18 may control the refresh rate of the display 12 by executing instructions included in an operating system (OS) or a software application running on the electronic device 10. In some embodiments where the refresh rate determination is included in a software application, the software application may be given a high priority.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method for operating a display, comprising:
   determining a number of pixels having medium grayscale levels from a histogram for at least a subset of an image, wherein the medium grayscale levels are more likely than other grayscale levels to cause flicker in pixels when using lower refresh rates;
   if the number does not exceed a first threshold, setting a refresh rate for at least the subset of the image to a first refresh rate;
   if the number exceeds the first threshold and a remaining number of pixels in the image surpasses a second threshold, arithmetically calculating the refresh rate for at least the subset of the image to a second refresh rate, wherein the first refresh rate is lower than the second threshold and the arithmetic calculation of the refresh rate is based at least in part a temporal contrast sensitivity function, wherein the temporal contrast sensitivity function comprises a color sensitivity function of eyes to a flicker of a corresponding color, and the temporal contrast sensitivity function also includes a pixel brightness sensitivity function of eyes to flicker based on brightness of a pixel; and
   determining a refresh rate for a display configured to display the image based at least in part on the refresh rate of at least the subset of the image, wherein the determined refresh rate reduces power consumption for the display while reducing likelihood of flicker when displaying the image when a lower than maximum refresh rate is available without likelihood of flicker.

2. The method of claim 1, comprising classifying grayscale levels as low, medium, or high grayscale levels prior to determining the number of pixels having the medium grayscale levels by determining cutoffs for classifying the low, medium, and high grayscale levels.

3. The method of claim 2, wherein values for the cutoffs are stored in memory.

4. The method of claim 2, wherein determining the cutoffs for classifying the low, medium, and high grayscale levels is based at least in part on whether a power savings mode or a display quality mode is enabled.

5. The method of claim 1, comprising, if the number exceeds the first threshold and the remaining number of pixels in the image does not surpass the second threshold:
   setting the refresh rate for at least the subset of the image to the first refresh rate; and
   compensating for the medium grayscale levels by changing at least one of the medium grayscale levels to a relatively low or relatively high grayscale level and inversely adjusting a backlight.

6. The method of claim 1, wherein the first refresh rate comprises 1 Hz or less.

7. The method of claim 1, wherein the second refresh rate comprises 30 Hz or more.

8. A non-transitory, computer-readable medium having stored thereon instructions that, when executed by a processor, cause the processor to:
   analyze a frame to be displayed using a plurality of blocks to determine an amount of a tendency to produce a visible flicker at lower frequencies on a display when the frame is displayed, wherein the tendency to produce a visible flicker is based at least in part on grayscale levels of pixels in the frame and spatial distribution of the grayscale levels;
   arithmetically calculate a refresh rate for each of the plurality of blocks configured to reduce a noticeability of the visible flicker during display of the frame while reducing display power consumption, wherein the arithmetic calculation is based at least in part on a temporal contrast sensitivity function, wherein the temporal contrast sensitivity function comprises a color sensitivity function of eyes to a flicker of a corresponding color, and the temporal contrast sensitivity function also includes a pixel brightness sensitivity function of eyes to flicker based on brightness of a pixel; and
   refresh the display using a display refresh rate based at least in part on the calculated refresh rates for the plurality of blocks.

9. The non-transitory, computer-readable medium of claim 8, wherein the instructions are included in an operating system (OS).

10. The non-transitory, computer-readable medium of claim 8, wherein the instructions are included in an application running on the processor.

11. The non-transitory, computer-readable medium of claim 8, wherein the plurality of blocks comprises a plurality of overlapping rectangles used to subdivide the frame for analysis.

12. The non-transitory, computer-readable medium of claim 8, wherein refreshing the display using the display refresh rate comprises refreshing the display using a highest of the calculated refresh rates for the plurality of blocks.

13. The non-transitory, computer-readable medium of claim 8, wherein refreshing the display using the display refresh rate comprises refreshing the display using an average of the calculated refresh rates for the plurality of blocks.

14. The non-transitory, computer-readable medium of claim 8, wherein refreshing the display using the display refresh rate comprises refreshing the display using a weighted average of the calculated refresh rates for the plurality of blocks.

15. A system, comprising:
   a processor; and
   a memory comprising a non-transitory, computer-readable medium having stored thereon instructions that, when executed by the processor, are configured to cause the processor to:
   subdivide a frame into one or more blocks;
   analyze grayscale levels in each of the one or more blocks;
   arithmetically calculate a refresh rate for each of the one or more blocks based at least in part on a distribution of grayscale levels between low, medium, and high grayscale levels, wherein the arithmetical calculation of the refresh rate is based at least in part a temporal contrast sensitivity function, wherein the temporal contrast sensitivity function comprises a color sensitivity function of eyes to a flicker of a corresponding color, and the temporal contrast sensitivity function also includes a pixel brightness sensitivity function of eyes to flicker based on a brightness of a pixel;
   set a refresh rate for each block of the one or more blocks based at least in part on the distribution of grayscale levels in the medium grayscale level, wherein the medium grayscale levels are more likely than other grayscale levels to cause flicker in pixels when using lower refresh rates; and
   set a refresh rate for a display based at least in part on the refresh rate of the one or more blocks, wherein the set refresh rate reduces power consumption for the display while reducing likelihood of flicker when displaying the image when a lower than maximum refresh rate is available without likelihood of flicker.

16. The system of claim 15, wherein the arithmetic calculation comprises using the following equation to determine a refresh rate for each block:

$$\theta_{avg}(\text{block}, fr) = \frac{\alpha_f(G, BL, fr) \sum \alpha_{rgb} \alpha_{br}(g, BL) \theta(g, fr) \gamma(g)}{\sum \alpha_{rgb} \gamma(g)},$$

where $\theta_{avg}(\text{block},fr)$ is a refresh rate for a block; $\alpha_f(G, BL,fr)$ is the temporal contrast sensitivity function based on a global grayscale level G, a backlight setting BL, and a target frame rate fr; $\alpha_{rgb}$ is a respective color sensitivity value of a color sensitivity function; $\alpha_{br}(g, BL)$ is the pixel brightness sensitivity function based on a grayscale level of the pixel g and the backlight setting BL; $\theta(g,fr)$ is a percent of luminance change based on the grayscale level of the pixel g and the refresh rate; and $\gamma(g)$ is a gamma curve.

17. The system of claim 16, wherein the color sensitivity comprises 0.2 to 0.5 for red, 0.8 to 1 for green, and 0.2 to 0.5 for blue.

18. The system of claim 15, comprising a phone, tablet, computer, or a combination thereof.

19. A method for operating a display, comprising:
   analyzing a frame to be displayed to determine an amount of a tendency to produce a visible flicker at lower frequencies on a display when the frame is displayed, wherein the tendency to produce a visible flicker is based at least in part on grayscale levels of pixels organized into blocks in the frame;

arithmetically calculating a refresh rate for the blocks based on the corresponding grayscale levels, wherein the arithmetic calculation of the refresh rate for each block is based at least in part on a temporal contrast sensitivity function, wherein the temporal contrast sensitivity function comprises a color sensitivity function of eyes to a flicker of a corresponding color, and the temporal contrast sensitivity function also includes a pixel brightness sensitivity function of eyes to flicker based on a brightness of a pixel;

determining a display refresh rate for the display that is configured to reduce a noticeability of the visible flicker during display of the frame while reducing display power consumption based at least in part on the refresh rate for the blocks; and refreshing the display using the display refresh rate.

20. The system of claim 18, wherein how often the frame is analyzed and the refresh rate is determined is based at least in part on an application running to display the frame.

21. A method for operating a display, comprising:

using a histogram for an image to be displayed on the display, determining whether the image has a number of medium grayscale levels exceeding a threshold, wherein the medium grayscale levels are more likely than other grayscale levels to cause flicker in pixels when using lower refresh rates;

if the number does not exceed the threshold, set a refresh rate for the display to a first refresh rate; and if the number exceeds the threshold:

subdivide the image into a plurality of blocks in a first scan for determining refresh rate for the display;

analyzing the plurality of blocks to determine grayscale levels of pixels in the plurality of blocks and color to be displayed by pixels in the plurality of blocks;

arithmetically calculating a refresh rate for each block of the plurality of blocks based at least in part on a temporal contrast sensitivity function, wherein the temporal contrast sensitivity function comprises a color sensitivity function of eyes to a flicker of a corresponding color and pixel brightness, and the temporal contrast sensitivity function also includes a pixel brightness sensitivity function of eyes to flicker based on a brightness of a pixel; and determine a refresh rate for the display based at least in part on the refresh rate of the plurality of blocks, wherein the determined refresh rate reduces power consumption for the display while reducing likelihood of flicker when displaying the image when a lower than maximum refresh rate is available without likelihood of flicker.

22. The method of claim 21, wherein analyzing the plurality of blocks comprises: identifying at least one of the plurality of blocks for further analysis;

subdividing each of the at least one of the plurality of blocks into a plurality of sub-blocks; and determining a refresh rate for each of the at least one of the plurality of blocks based at least in part on the plurality of sub-blocks.

23. The method of claim 21, comprising determining the refresh rate for the display each time that the image changes.

24. The method of claim 2, comprising determining the refresh rate for the display upon receipt of an indication that a page of an electronic book is to be turned.

\* \* \* \* \*